UNITED STATES PATENT OFFICE.

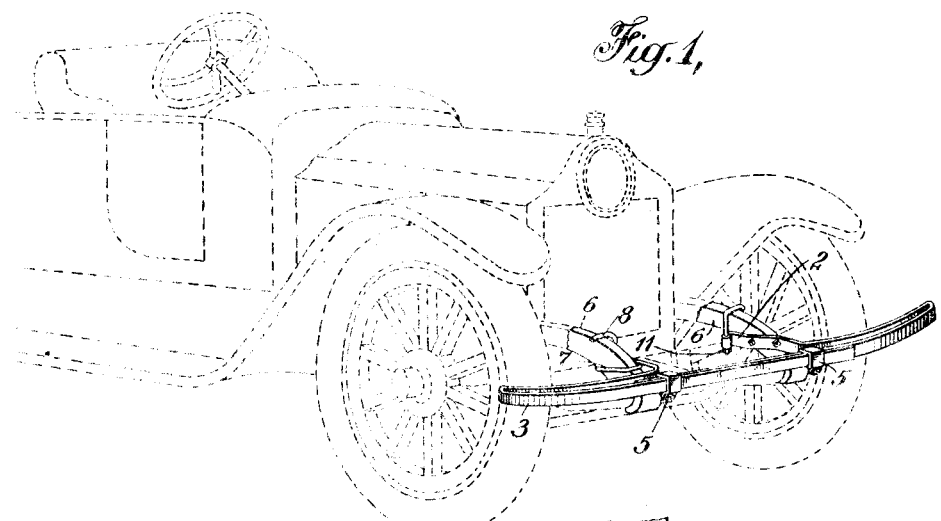
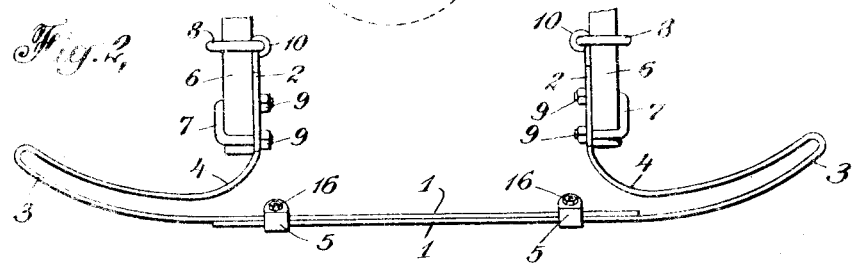
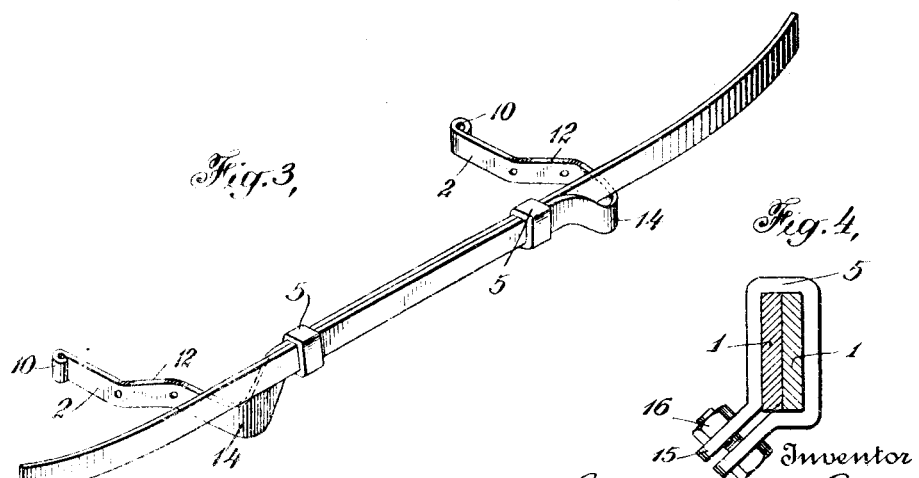
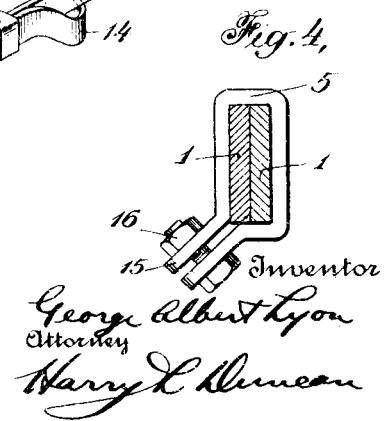

GEORGE ALBERT LYON, OF PHILADELPHIA, PENNSYLVANIA, ASSIGNOR TO LYON NON-SKID COMPANY, OF PHILADELPHIA, PENNSYLVANIA, A CORPORATION OF PENNSYLVANIA.

BUFFER FOR MOTOR-VEHICLES.

1,198,246. Specification of Letters Patent. Patented Sept. 12, 1916.

Original application filed April 21, 1913, Serial No. 762,548. Divided and this application filed June 30, 1916. Serial No. 106,751.

*To all whom it may concern:*

Be it known that I, GEORGE ALBERT LYON, of Philadelphia, county of Philadelphia, State of Pennsylvania, have made a certain new and useful Invention Relating to Buffers for Motor-Vehicles, of which the following is a specification, taken in connection with the accompanying drawing, which forms part of the same.

The invention described in this application, which is a continuation and division of, that is, contains subject-matter taken from my co-pending application, Serial No. 762,548, filed April 21, 1913, relates particularly to a motor vehicle buffer comprising opposed resilient parts or springs, each of which may comprise a transverse member and a longitudinal member, the transverse members overlapping and being secured together by detachable clips or connectors, and the longitudinal members being secured to the corresponding side frames of the vehicle, for instance. A laterally extending loop member may be interposed between the transverse member of the buffer and the longitudinally or rearwardly extending attaching member and such loops may be bent rearwardly and act as a wheel guard by extending in front of the wheel of the automobile.

An object of this invention is to provide a simple and effective form of resilient buffer for motor vehicles which can be readily applied to or removed from the frame of the vehicle and is equally available for use with automobiles having frames of different widths, sizes or shapes. This object is attained in the manner hereinafter set forth, reference being had to the accompanying drawings showing in a somewhat diagrammatic way illustrative embodiments of this invention, and in which—

Figure 1 is a perspective view of the forward end of a motor vehicle with the improved buffer applied thereto. Fig. 2 is a plan or top view of the buffer and parts of the side members of the vehicle frame to which it is attached. Fig. 3 is a perspective view of a modified form of buffer embodying this invention; and Fig. 4 is a sectional view showing the connecting clip constituting one of the elements of the buffer.

The illustrative form of buffer which is shown in Figs. 1 and 2 consists of two similar but reversely arranged parts or elements, one of which is carried by one side member of the motor vehicle frame and the other by the opposite side member thereof to which they are secured or attached by any suitable attaching devices. Each part of the buffer is preferably formed of a single rectangular sectioned bar or spring strip of steel or other resilient metal having considerably greater width than thickness, the greater dimension of the strip being disposed vertically. Each part of the buffer may comprise a transverse or front member 1 extending across the front of the motor vehicle and a longitudinally or rearwardly extending member 2 substantially parallel with the side member 6 of the automobile to which it is secured. A rearwardly bent loop 3 having an open inner end may be interposed between the transverse member and the rearwardly extending attaching member of the buffer which may also be formed with an inwardly and rearwardly extending curved member 4 which adds to the resilience of the connection between these parts. The transverse members 1 of the opposite parts of the buffer may overlap one another as indicated in the drawing and they are preferably detachably but rigidly held together by suitable connecting means, such as the clips 5 shown in Figs. 2 and 4, which can be tightened so as to hold substantially rigid against relative vertical movement these transverse members which may overlap each other substantially across the front of the buffer between the side frames of the vehicle. This detachable connecting means thus facilitates the relative transverse adjustment of the parts of the buffer so as to make it readily applicable to vehicles having side frames or other supporting members which are located at different distances apart, the transverse buffer members being preferably straight throughout these overlapping portions so as to more effectively reinforce and stiffen the front of the buffer and insure close contact throughout these overlapping portions. By having the ends 15 of the clip 5 extend rearwardly and downwardly in a somewhat diagonal direction, as indicated in Fig. 4, the tightening of the clip as by the bolt 16 clamps the transverse members 1 in both a vertical and horizontal direction, and this arrangement also serves to very largely conceal this bolt and clip ends so that the clips resemble mere bands.

The longitudinally or rearwardly extending member of each part of the buffer may be separately secured either on the inside or outside face of the corresponding member 6 of the vehicle frame by any suitable attaching devices, such for instance, as the U-bolt or yoke bolt 7 and the L-bolt or hook bolt 8. The U-bolt 7 may embrace the frame member and have legs passing through openings in the attaching member 2 of the buffer element and threaded to receive securing nuts 9, as shown in Figs. 1 and 2. The L-bolt 8 may overlap the top of the frame member 6 and pass down through an eye 10 which may be formed at the rear end of the attaching member 2 of the buffer, this portion of the bolt being likewise threaded at its lower end to coöperate with a securing nut 11 as shown. By this means a three-point bearing is provided, the forward bearing points being respectively on the top and bottom faces of the frame member so that when the L-bolt 8 is tightened a leverage is exerted on the buffer member which causes the upper and lower legs of the U-bolt 7 to press firmly against the top and bottom of the frame member 6 so that the attaching member 2 of the buffer is securely held or attached thereto, besides being firmly held against the side of the frame member by the clamping action of this U-bolt. That part of the rearwardly extending attaching member 2 of the buffer which coöperates with the U-bolt 7 may be given an inclined position, as shown in Fig. 1 so as to promote the application of the buffer members to motor vehicle frame members having different depth or shape while still maintaining in vertical position the flat spring strips of which the buffer is composed. When the two parts of the buffer have been attached to the side frames of the motor vehicle as above described the overlapping transverse members which constitute the impact receiving portions in the front of the vehicle may be brought into alinement with each other and rigidly connected as by the connecting means or clips 5 which may rigidly hold these transverse impact receiving members against relative movement and correspondingly stiffen and reinforce this part of the buffer.

The rearwardly curved loop member 3 of each part of the buffer may serve as a wheel guard and in this form of buffer this laterally extending loop always extends outward a substantially fixed distance beyond the vehicle frame which is advantageous in many cases; and also since the two elements of the buffer are symmetrical the ends of its overlapping transverse members always project the same distance on opposite sides of the center of the buffer, which is desirable because it insures the symmetrical central position of this reinforced front portion. In the modified form of buffer shown in Fig. 3, however, this lateral loop member is omitted and that end of each of the transverse members of the buffer which is opposite to the connected attaching member is extended laterally and also preferably curved rearwardly to some extent so as to act as a wheel guard. In this form of buffer the connections 14 between the transverse members and rearwardly extending attaching members 2 of the buffer are preferably bent as indicated and also offset so that one part of the buffer may clear the other vertically at crossing points and the intermediate portion 12 of the attaching member of the buffer is also preferably given an inclined position in this form of the device. The front portion of the buffer because of the reinforcement secured by the overlapping of the connected transverse members is very strong while still possessing a certain amount of resiliency because of the springy character of the metal of which the device is composed. In the form of buffer shown in Figs. 1 and 2 this resiliency or horizontally yielding action is increased by the elasticity of the inner and outer members of the lateral wheel guarding loops 3 and of the curved members 4. In this way the buffer has a very considerable extent of horizontally yielding spring action under collision conditions, so that when running at moderate speed the vehicle is not instantly brought to a stop when the buffer engages another vehicle or stationary object since the momentum is taken up by the resilience of the buffer which also causes the vehicle to rebound or move away from the object struck without destructive or undesirable shock or impact and without permanent deformation of the tempered spring steel buffer. At the same time owing to the fact that the longer dimension of the flat strip or bar constituting the buffer parts is arranged in vertical position the buffer is substantially rigid against vertical strain so as to be practically free from objectionable vibration under ordinary running conditions of the vehicle. The parts of the buffer are so connected together and to the vehicle and so support each other that the buffer opposes a yielding spring resistance to fore and aft strains as is desirable in a buffer intended for automobile use for the purposes for which this improved buffer has been designed, and it is of course understood that buffers of this character may be mounted in other positions on automobiles or other motor vehicles and in front thereof. By making up this buffer of two tempered spring steel strips its manufacture is greatly facilitated because of the smaller size of these parts and the greater ease of bending them and particularly because these smaller units can be much more effectively and regularly hardened and tempered with very much less danger of warping or distortion than if the buffer was made in one piece of spring steel.

This invention has been described in connection with a number of illustrative embodiments, forms, proportions, parts, arrangements, materials, methods of use and connection, to the details of which disclosure the invention is not of course to be limited, since

What is claimed as new and what is desired to be secured by Letters Patent is set forth in the appended claims:

1. The automobile buffer consisting of two similar integral spring steel strips having many times greater vertical width than thickness to render them relatively rigid vertically while resiliently yielding in horizontal directions, each of said strips having an inwardly and rearwardly extending attaching member to be attached to the side members of the frame of the automobile, and having a transversely extending impact receiving member and an intermediate rearwardly curved loop formed with an open inner end and extending into protective position in front of the automobile wheels, the impact receiving members of said strips overlapping substantially throughout the distance between the side frames of the automobile to stiffen and strengthen this part of the buffer, and means adjustably connecting said impact receiving members and holding them against relative vertical movement and providing for the lateral adjustment of said strips so as to adapt the buffer for attachment to automobiles having side frame members located at different distances apart.

2. The automobile buffer consisting of two similar integral spring steel strips having several times greater vertical width than thickness to render them relatively rigid vertically while resiliently yielding in horizontal directions, each of said strips having a rearwardly extending attaching member to be attached to the side members of the frame of the automobile, and having a transversely extending impact receiving member and an intermediate loop formed with an open inner end and extending into protective position adjacent the automobile wheel, the impact receiving members of said strips overlapping to stiffen and strengthen this part of the buffer, and means adjustably connecting said impact receiving members and holding them against relative vertical movement and providing for the lateral adjustment of said strips so as to adapt the buffer for attachment to automobiles having side frame members located at different distances apart.

3. The automobile buffer consisting of two integral spring steel strips having considerably greater vertical width than thickness to render them relatively rigid vertically while resiliently yielding in horizontal directions, each of said strips having a rearwardly extending attaching member to be attached to the automobile, and having a transversely extending impact receiving member and an intermediate curved resilient member, the impact receiving members of said strips overlapping to stiffen and strengthen this part of the buffer, and means adjustably connecting said impact receiving members and holding them against relative vertical movement and providing for the lateral adjustment of said strips so as to adapt the buffer for attachment to automobiles having supporting members located at different distances apart.

4. The automobile buffer consisting of two similar integral spring steel strips having many times greater vertical width than thickness to render them relatively rigid vertically while resiliently yielding in horizontal directions, each of said strips having an inwardly and rearwardly extending attaching member to be attached to the side members of the frame of the automobile, and having a transversely extending impact receiving member and an intermediate rearwardly curved loop formed with an open inner end and extending into protective position adjacent the automobile wheel, and connecting means adjustably connecting said impact receiving members and holding them against relative vertical movement and forming overlapping members to stiffen and strengthen this part of the buffer and providing for the lateral adjustment of said strips so as to adapt the buffer for attachment to automobiles having side frame members located at different distances apart.

5. The automobile buffer consisting of two integral spring steel strips having greater vertical width than thickness to render them relatively rigid vertically while resiliently yielding in horizontal directions, each of said strips having an attaching member to be attached to the automobile, and having a transversely extending impact receiving member and an intermediate loop, and connecting means adjustably connecting said impact receiving members and holding them against relative vertical movement and forming overlapping members to stiffen and strengthen this part of the buffer and providing for the lateral adjustment of said strips so as to adapt the buffer for attachment to automobiles having supporting members located at different distances apart.

6. The automobile buffer consisting of two integral spring steel strips having greater vertical width than thickness to render them relatively rigid vertically while resiliently yielding in horizontal directions, each of said strips having an attaching member to be attached to the automobile, and having a transversely extending impact receiving member and an intermediate loop, and frictionally gripping connecting means adjustably connecting said impact receiving members and holding them against relative vertical movement and forming overlapping members to stiffen and strengthen this part of the buffer and providing for the lateral adjustment of said strips so as to adapt the buffer for attachment to automobiles having supporting members located at different distances apart.

7. The automobile buffer comprising horizontally yielding and relatively vertically rigid elements having transversely extending impact receiving members and having attaching members to be attached to the vehicle, and adjustable connecting means connecting said impact receiving members and holding them against relative vertical movement and forming overlapping reinforcing members in the impact receiving portion of the buffer, said connecting means providing for the lateral adjustment of said buffer to adapt it for attachment to parts of vehicles located at different distances apart.

8. The automobile buffer comprising horizontally yielding and substantially vertically rigid elements including a pair of transversely extending impact receiving members, curved resilient members comprising open-ended lateral loops and attaching members to be attached to the vehicle, connecting means connecting said impact receiving members and holding them against substantial relative vertical movement and forming in connection therewith overlapping reinforcing members in the front portion of the buffer, and means providing for the lateral adjustment of said attaching members to adapt them for attachment to parts of vehicles located at different distances apart.

9. The automobile buffer comprising horizontally yielding and substantially vertically rigid elements including transversely extending impact receiving members and open-ended lateral loops, connected attaching members to be attached to the vehicle, connecting means connecting said impact receiving members and holding them against substantial relative vertical movement and means providing for the lateral adjustment of said attaching members to adapt them for attachment to parts of vehicles located at different distances apart.

10. The vehicle buffer comprising vertically rigid lateral spring members having longitudinally extending attaching members to be attached to supporting members of the vehicle and having a transverse member secured to another transversely extending spring member of the buffer so as to be laterally adjustable with respect thereto and adapt the buffer to vehicles having supporting members located at different distances apart.

11. The automobile buffer comprising two similar parts, each having a longitudinally extending attaching portion, a laterally extending loop portion and an impact receiving portion extending inwardly from said loop portion, and frictionally gripping connecting means to hold together against relative vertical movement similar parts of said impact receiving portions.

12. The vehicle buffer comprising two parts, each having a longitudinally extending attaching portion, a laterally extending loop portion to be mounted on each side of the vehicle and an impact receiving portion extending inwardly from said loop portion, and connecting means to hold together parts of said impact receiving portions.

13. The automobile buffer comprising vertically rigid springs having transversely extending members and rearwardly extending attaching members adapted to be attached to a side bar of the vehicle frame, one of said transversely extending members being arranged adjacent another transversely extending impact receiving member of the buffer, and means for adjustably securing together said adjacent transversely extending members to enable said attaching members to fit vehicles having side bars located at different distances apart.

14. The automobile buffer comprising a vertically rigid spring having a transversely extending member and a rearwardly extending attaching member adapted to be attached to a side bar of the vehicle frame, said transversely extending member being arranged adjacent another transversely extending spring member of the buffer, and means for securing together said adjacent transversely extending members.

15. The vehicle buffer comprising open-ended loops extending outwardly at the transverse ends of the buffer and connecting means at the front of the buffer to space said loops apart, said loops and connecting means being vertically rigid but horizontally yieldable and rearwardly extending attaching means on each side of the buffer and integral with the corresponding loop to mount said buffer on the vehicle frame and relatively adjustable to fit the side members of vehicle frames which are at different distances apart.

16. The automobile buffer comprising two vertically rigid springs having rearwardly extending members for attachment to the vehicle frame and transversely extending members one of which is adjustably connected in overlapping position with another transverse member of the buffer to make said buffer adjustable to fit automobiles having supporting members at different distances apart.

17. The automobile buffer comprising two similar parts each having a longitudinally extending attaching portion, a laterally extending resilient loop portion and an impact receiving portion extending inwardly from said loop portion and connecting means to hold together against relative vertical movement parts of said impact receiving portions and form in connection therewith overlapping members to stiffen and strengthen this part of the buffer.

18. The automobile buffer comprising open-ended loops extending outwardly at the transverse ends of the buffer and an impact receiving portion forming a continuation of said loops and spacing them apart, said loops and impact receiving portion being vertically rigid but horizontally yieldable and rearwardly extending attaching means to mount said buffer on the vehicle frame and relatively adjustable to fit the supporting members of the vehicle which are at different distances apart.

GEORGE ALBERT LYON.

Witnesses:
HARRY L. DUNCAN,
JESSIE B. KAY.